(12) United States Patent
Koreeda

(10) Patent No.: US 6,522,476 B2
(45) Date of Patent: Feb. 18, 2003

(54) THREE-GROUP ZOOM LENS

(75) Inventor: Daisuke Koreeda, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/774,722

(22) Filed: Feb. 1, 2001

(65) Prior Publication Data

US 2001/0013979 A1 Aug. 16, 2001

(30) Foreign Application Priority Data

Feb. 2, 2000 (JP) .......................................... 2000-25381

(51) Int. Cl.$^7$ ............................................... G02B 15/14
(52) U.S. Cl. ....................... 359/681; 359/682; 359/689; 359/684
(58) Field of Search ................................. 359/689, 684, 359/680, 681–682

(56) References Cited

U.S. PATENT DOCUMENTS

| | | | | |
|---|---|---|---|---|
| 5,550,679 A | * | 8/1996 | Sugawara ................... | 359/689 |
| 5,909,318 A | | 6/1999 | Tanaka | |
| 5,910,860 A | | 6/1999 | Ozaki et al. | |
| 6,124,984 A | * | 9/2000 | Shibayama et al. ......... | 359/689 |
| 6,308,011 B1 | * | 10/2001 | Wachi et al. ............... | 359/689 |

FOREIGN PATENT DOCUMENTS

| | | |
|---|---|---|
| JP | 10-39214 | 2/1998 |
| JP | 10293253 | 11/1998 |
| JP | 11-52246 | 2/1999 |

OTHER PUBLICATIONS

English Language Abstract of JP 10–39214.

* cited by examiner

*Primary Examiner*—Scott J. Sugarman
(74) *Attorney, Agent, or Firm*—Greenblum & Bernstein, P.L.C.

(57) ABSTRACT

A three-group zoom lens has, from an object side, a first group lens having a positive power, a second group lens having a negative power and a third group lens consisting of a positive lens. The second lens group includes an aperture stop. When a distance to be focused is infinity, only the first lens group and the second lens group move for zooming. At least one positive lens included in the zoom lens has an aspherical surface whose positive power is greater at a portion farther from an optical axis thereof. The zoom lens satisfies the following conditions:

$$-0.85 < f2/f1 < -0.65$$

and $$5.0 < f3/fw < 8.0$$

where, fw represents a focal length when positioned at a wide-extremity, and f1, f2 and f3 respectively represent focal lengths of the first, second and third lens groups.

17 Claims, 11 Drawing Sheets

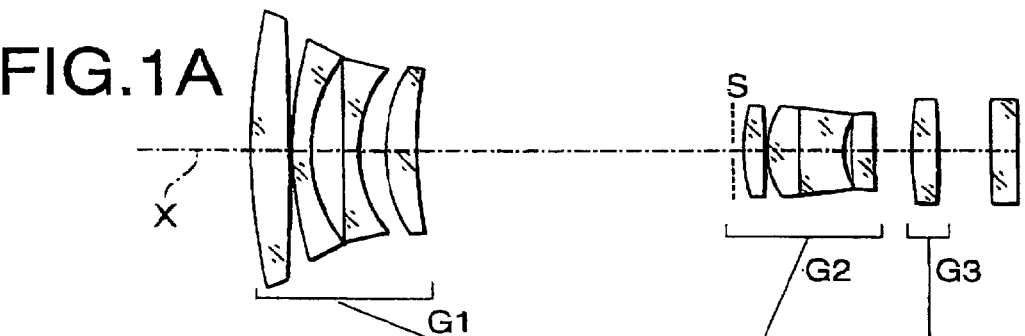
FIG. 1A
FIG. 1B
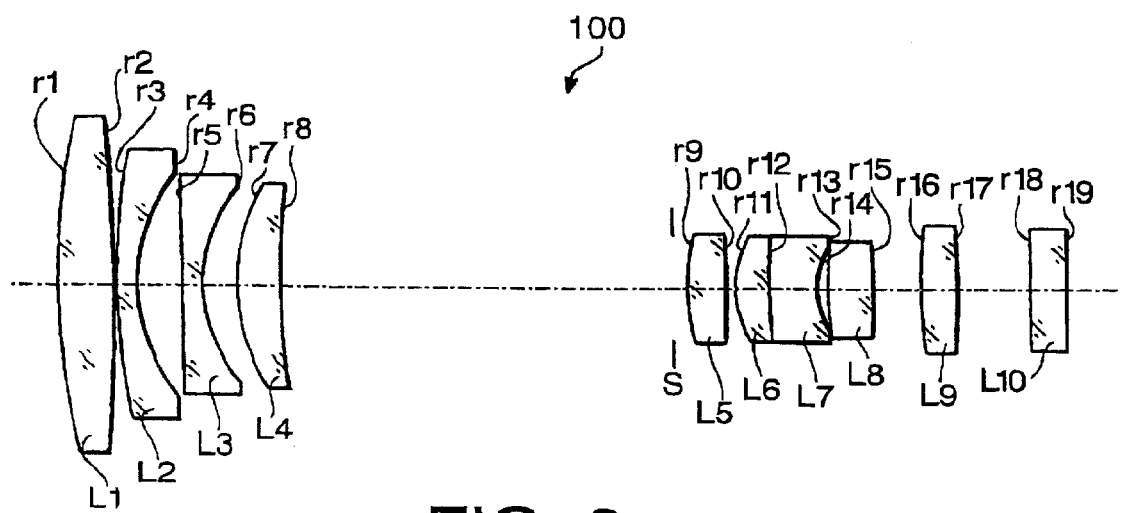
FIG. 2

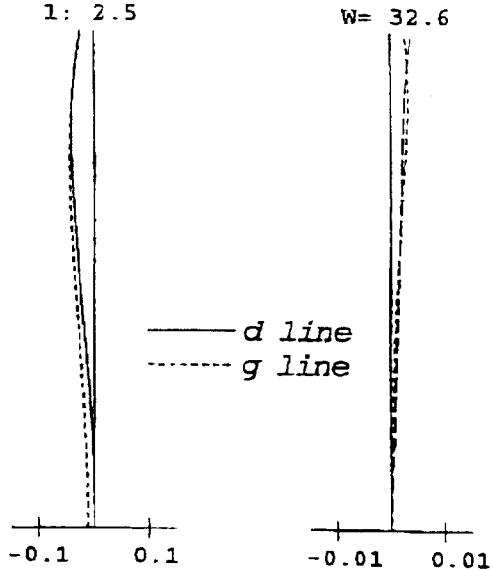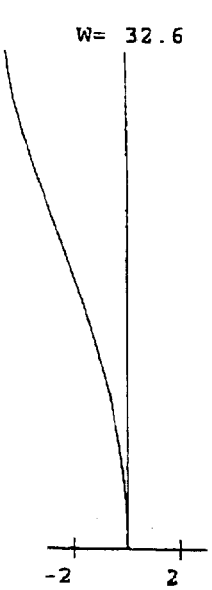
FIG.11A    FIG.11B    FIG.11C    FIG.11D
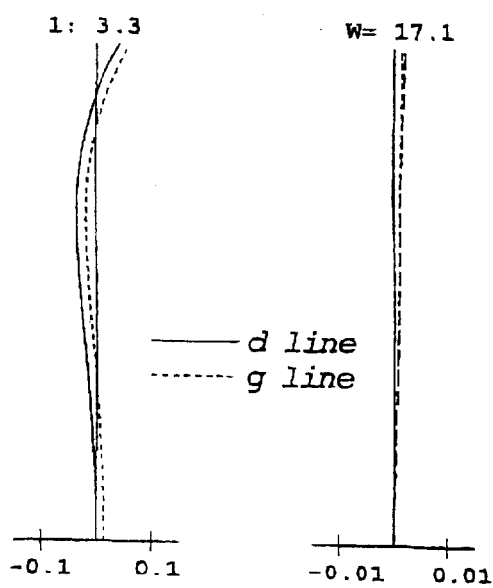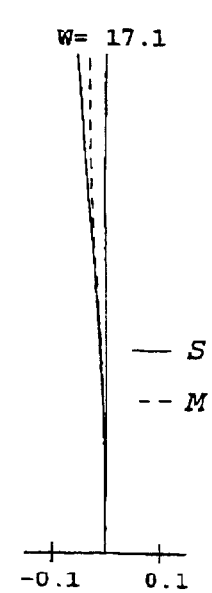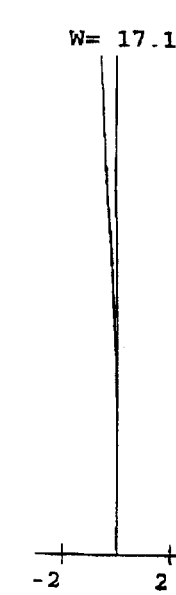
FIG.12A    FIG.12B    FIG.12C    FIG.12D

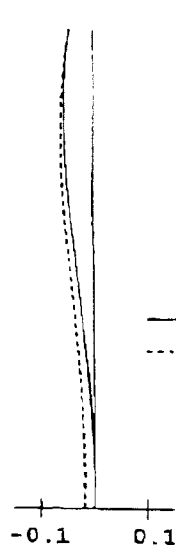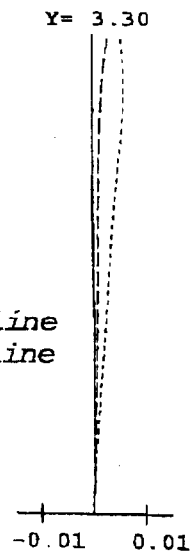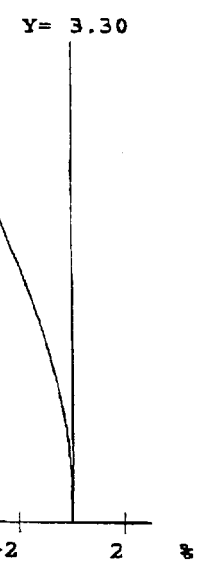
FIG.13A  FIG.13B  FIG.13C  FIG.13D
FIG.14A  FIG.14B  FIG.14C  FIG.14D

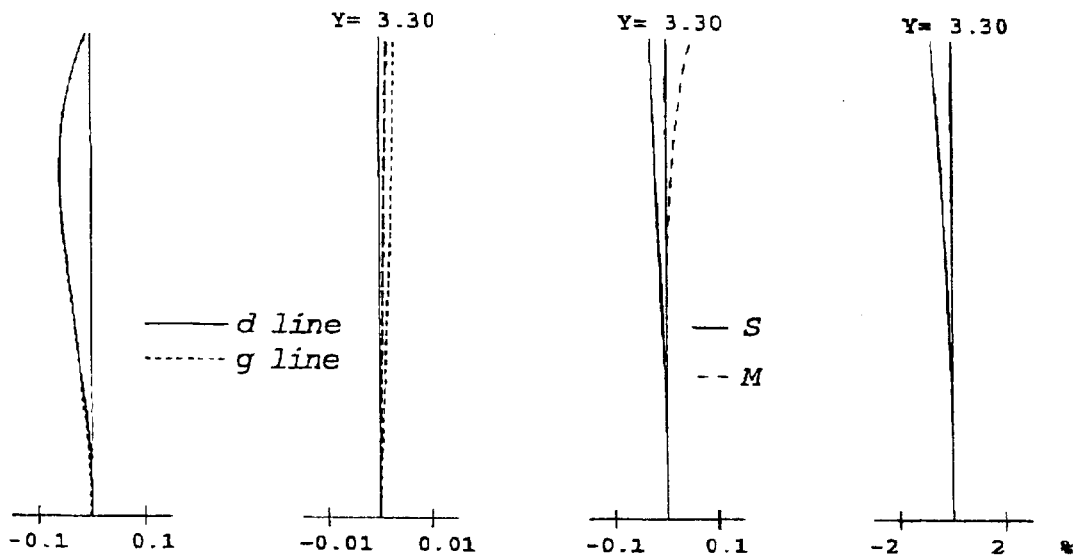
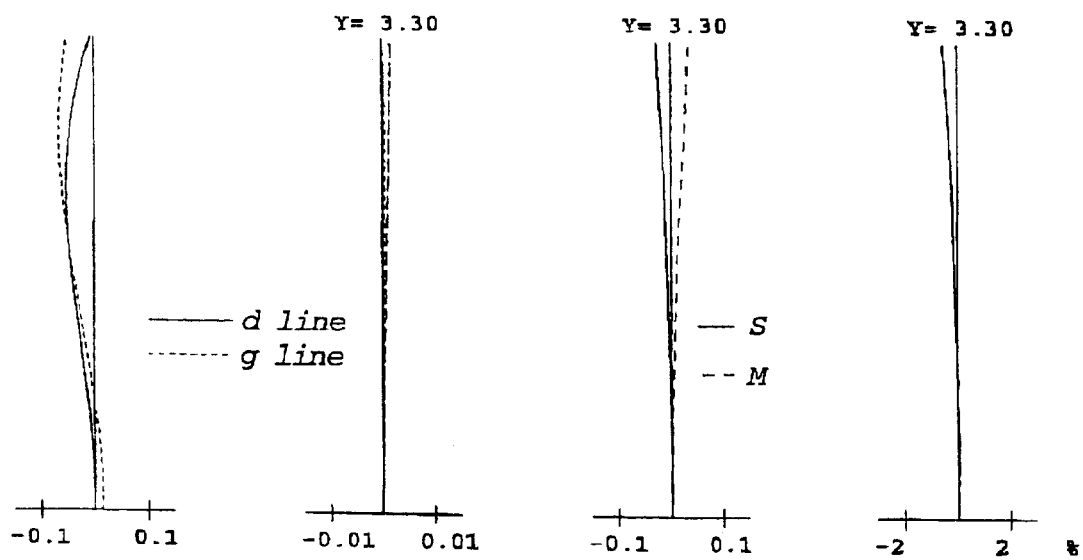

THREE-GROUP ZOOM LENS

BACKGROUND OF THE INVENTION

The present invention relates to a three-group zoom lens for a camera.

Conventionally, a three-group zoom lens has been widely used as a zoom lens for various cameras. Examples of such a three-group zoom lens are disclosed in Japanese Patent Provisional Publications Nos. HEI 11-52256 and HEI 10-39214. In each of the three-group zoom lenses disclosed in the publications, the first lens group consists of, from an object side, a negative lens, a negative lens and a positive lens. With this configuration, a diameter of the lens can be decreased and therefore the entire lens system can be downsized. However, in this type of zoom lens, distortion cannot be compensated sufficiently.

In Japanese Patent Provisional Publication No. HEI 10-293253, another configuration of three-group zoom lens is disclosed. In this three-group zoom lens, a first lens group consists of a positive lens, a negative lens, a negative lens and a positive lens. With this structure, since a positive lens is provided as a first lens of the first lens group, the distortion can be well compensated. In this zoom lens, the third lens group is moved for focusing. In this zoom lens, when a distance to be focused is relatively small, curvature of field and lateral chromatic aberration cannot be compensated sufficiently, and therefore, the optical performance of the zoom lens is deteriorated when an object is located at a relatively close position with respect to the camera.

SUMMARY OF THE INVENTION

It is therefore an object of the invention to provide an improved three-group zoom lens, which is a rear-focusing type three-group zoom lens, having an excellent optical performance over an range from a close object distance to infinity.

For the above object, according to the invention, there is provided a three-group zoom lens having, from an object side, a first group lens, a second group lens and a third group lens, the first lens group having a negative power, the second lens group having a positive power, the second lens group including an aperture stop, the third lens group consisting of a single positive lens. With this structure, the zoom lens is further configured such that, when a distance to be focused is infinity, only the first lens group and the second lens group move for zooming, and at least one positive lens included in the zoom lens has an aspherical surface whose positive power is greater at a portion farther from an optical axis thereof. Additionally, the zoom lens is configured to satisfy following conditions:

$$0.85 < f2/f1 < -0.65;$$

and $$5.0 < f3/fw < 8.0,$$

where, fw represents a focal length when the zoom lens is positioned at a wide-extremity, f1 represents a focal length of the first lens group, f2 represents a focal length of the second lens group, and f3 represents a focal length of the third lens group.

Optionally, the first lens group includes, from the object side, a positive lens, a negative meniscus lens, a negative lens and a positive lens, and wherein the first lens group satisfies a following condition:

$$0.37 < f1n/f1 < 0.60$$

where, f1n represents a combined focal length of negative lenses included in the first lens group.

Optionally or alternatively, the second lens group may include, from the object side, a positive lens, a cemented lens including a positive lens and a negative lens, and a positive lens, and the second lens group may satisfy a condition:

$$0.35 < R/f2 < 0.55$$

where, R represents a radius of curvature of an object side surface of the cemented lens.

Optionally or alternatively, the zoom lens is configured to satisfy a condition:

$$D2(w) < D3(t)$$

where, D2(w) represents a distance between an image side surface of the second lens group and an image plane when the zoom lens is positioned at a wide-extremity, and wherein D3(t) represents a distance between a first surface of the third lens group and the image plane when the zoom lens is positioned at the wide-extremity and a distance to be focused is a closest focusable distance.

Optionally or alternatively, the zoom lens may satisfy following conditions:

$$0.0 < (R2+R1)/(R2-R1) < 1.3;$$

and $$0.05 < \Delta III(asp) < 0.12,$$

where, R1 is a radius of curvature of an object side surface of the third lens group, R2 is a radius of curvature of an image side surface of the third lens group, and $\Delta III(asp)$ is an aberration coefficient of astigmatic difference normalized such that the focal length of the zoom lens positioned at a tele-extremity is represented by one.

BRIEF DESCRIPTION OF THE ACCOMPANYING DRAWINGS

FIG. 1A shows a lens arrangement of a three-group zoom lens to which the present invention is applied, when the lens groups are arranged at a wide-extremity position;

FIG. 1B shows a lens arrangement of the three-group zoom lens when the lens groups are arranged at a tele-extremity position;

FIG. 2 shows a structure of the three-group zoom lens according to the embodiments of the invention;

Figures 3A, 3B, 3C, 3D, 4A, 4B, 4C, 4D:
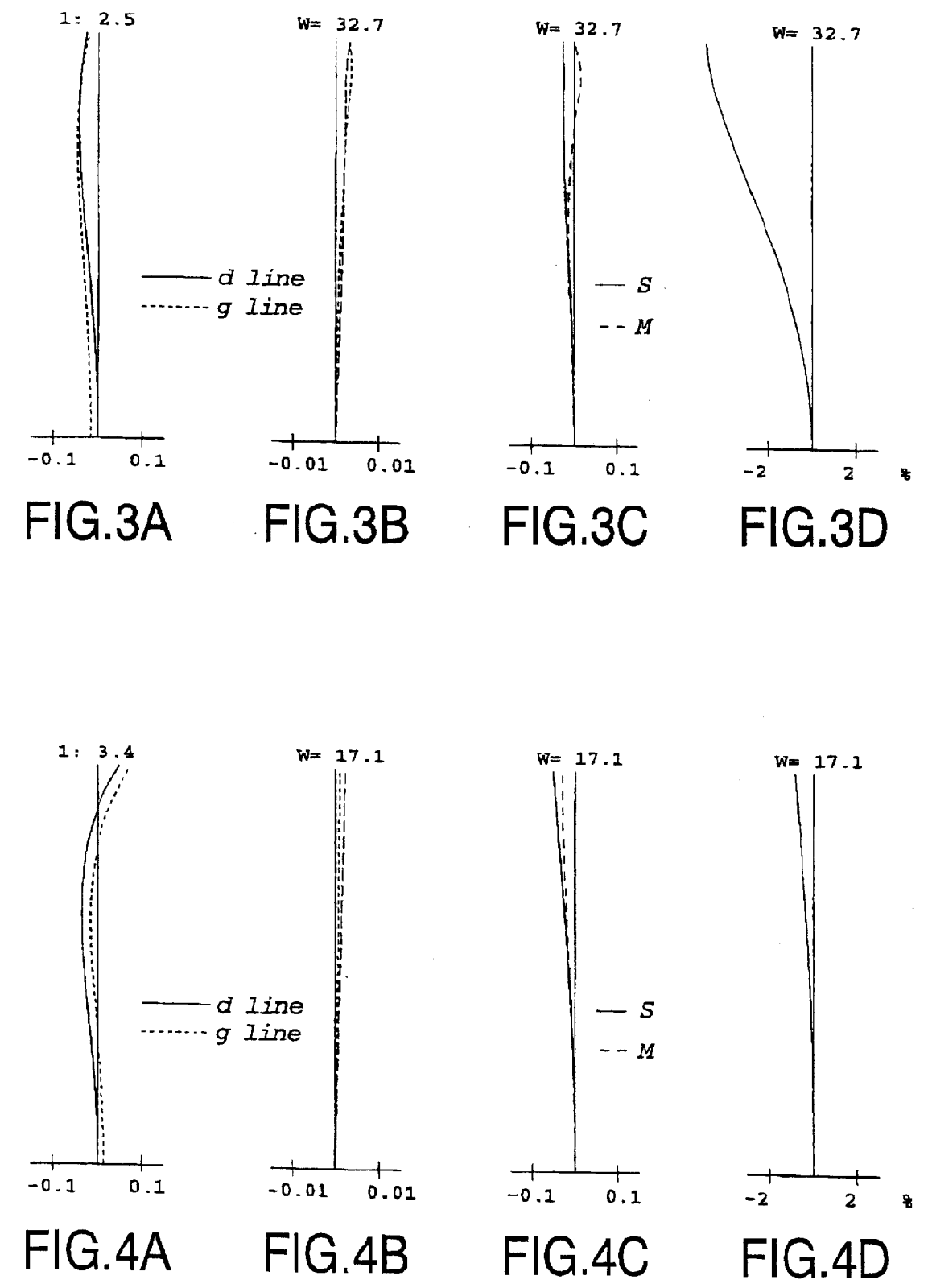

FIG. 3A shows chromatic aberration indicated by spherical aberration for d-line and g-line, when a three-group zoom lens according to a first embodiment is positioned at the wide-extremity and a distance to be focused is infinity;

FIG. 3B shows lateral chromatic aberration when the three-group zoom lens according to the first embodiment is positioned at the wide-extremity and the distance to be focused is infinity;

FIG. 3C shows astigmatism when the three-group zoom lens according to the first embodiment is positioned at the wide-extremity and distance to be focused is infinity;

FIG. 3D shows distortion when the three-group zoom lens according to the first embodiment is positioned at the wide-extremity and the distance to be focused is infinity;

FIG. 4A shows chromatic aberration indicated by spherical aberration for d-line and g-line, when a three-group zoom lens according to a first embodiment is positioned at the intermediate position and a distance to be focused is infinity;

FIG. 4B shows lateral chromatic aberration when the three-group zoom lens according to the first embodiment is positioned at the intermediate position and the distance to be focused is infinity;

FIG. 4C shows astigmatism when the three-group zoom lens according to the first embodiment is positioned at the intermediate position and distance to be focused is infinity;

FIG. 4D shows distortion when the three-group zoom lens according to the first embodiment is positioned at the intermediate position and the distance to be focused is infinity;

Figures 5A, 5B, 5C, 5D, 6A, 6B, 6C, 6D:
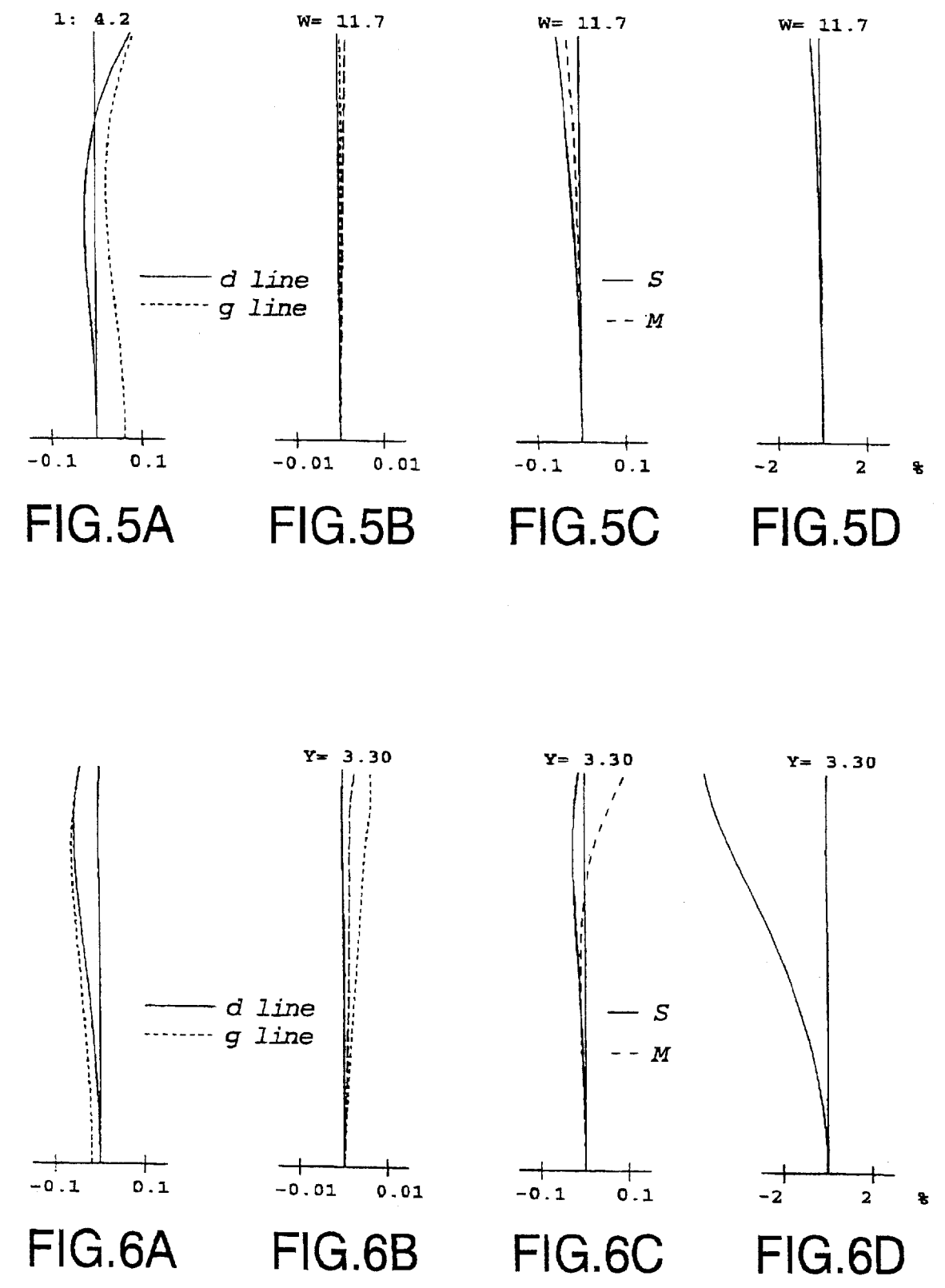

FIG. 5A shows chromatic aberration indicated by spherical aberration for d-line and g-line when a three-group zoom lens according to a first embodiment is positioned at the tele-extremity and a distance to be focused is infinity;

FIG. 5B shows lateral chromatic aberration when the three-group zoom lens according to the first embodiment is positioned at the tele-extremity and the distance to be focused is infinity;

FIG. 5C shows astigmatism when the three-group zoom lens according to the first embodiment is positioned at the tele-extremity and distance to be focused is infinity;

FIG. 5D shows distortion when the three-group zoom lens according to the first embodiment is positioned at the tele-extremity and the distance to be focused is infinity;

FIG. 6A shows chromatic aberration indicated by spherical aberration for d-line and g-line, when a three-group zoom lens according to a first embodiment is positioned at the wide-extremity and a distance to be focused is close;

FIG. 6B shows lateral chromatic aberration, when the three-group zoom lens according to the first embodiment is positioned at the wide-extremity and the distance to be focused is close;

FIG. 6C shows astigmatism when the three-group zoom lens according to the first embodiment is positioned at the wide-extremity and distance to be focused is close;

FIG. 6D shows distortion when the three-group zoom lens according to the first embodiment is positioned at the wide-extremity and the distance to be focused is close;

FIG. 11A shows chromatic aberration indicated by spherical aberration when a three-group zoom lens according to a second embodiment is positioned at the wide-extremity and a distance to be focused is infinity;

FIG. 11B shows lateral chromatic aberration when the three-group zoom lens according to the second embodiment is positioned at the wide-extremity and the distance to be focused is infinity;

FIG. 11C shows astigmatism when the three-group zoom lens according to the second embodiment is positioned at the wide-extremity and distance to be focused is infinity;

FIG. 11D shows distortion when the three-group zoom lens according to the second embodiment is positioned at the wide-extremity and the distance to be focused is infinity;

FIG. 12A shows chromatic aberration indicated by spherical aberration when a three-group zoom lens according to a second embodiment is positioned at the intermediate position and a distance to be focused is infinity;

FIG. 12B shows lateral chromatic aberration when the three-group zoom lens according to the second embodiment is positioned at the intermediate position and the distance to be focused is infinity;

FIG. 12C shows astigmatism when the three-group zoom lens according to the second embodiment is positioned at the intermediate position and distance to be focused is infinity;

FIG. 12D shows distortion when the three-group zoom lens according to the second embodiment is positioned at the intermediate position and the distance to be focused is infinity;

FIG. 13A shows chromatic aberration indicated by spherical aberration when a three-group zoom lens according to a second embodiment is positioned at the tele-extremity and a distance to be focused is infinity;

FIG. 13B shows lateral chromatic aberration when the three-group zoom lens according to the second embodiment is positioned at the tele-extremity and the distance to be focused is infinity;

FIG. 13C shows astigmatism when the three-group zoom lens according to the second embodiment is positioned at the tele-extremity and distance to be focused is infinity;

FIG. 13D shows distortion when the three-group zoom lens according to the second embodiment is positioned at the tele-extremity and the distance to be focused is infinity;

FIG. 14A shows chromatic aberration indicated by spherical aberration when a three-group zoom lens according to a second embodiment is positioned at the wide-extremity and a distance to be focused is close;

FIG. 14B shows lateral chromatic aberration, when the three-group zoom lens according to the second embodiment is positioned at the wide-extremity and the distance to be focused is close;

FIG. 14C shows astigmatism when the three-group zoom lens according to the second embodiment is positioned at the wide-extremity and distance to be focused is close;

FIG. 14D shows distortion when the three-group zoom lens according to the second embodiment is positioned at the wide-extremity and the distance to be focused is close;

FIG. 15A shows chromatic aberration indicated by spherical aberration for d-line and g-line, when a three-group zoom lens according to a second embodiment is positioned at the intermediate position and a distance to be focused is close;

FIG. 15B shows lateral chromatic aberration, when the three-group zoom lens according to the second embodiment is positioned at the intermediate position and the distance to be focused is close;

FIG. 15C shows astigmatism when the three-group zoom lens according to the second embodiment is positioned at the intermediate position and distance to be focused is close;

FIG. 15D shows distortion when the three-group zoom lens according to the second embodiment is positioned at the intermediate position and the distance to be focused is close;

FIG. 16A shows chromatic aberration indicated by spherical aberration when a three-group zoom lens according to a second embodiment is positioned at the tele-extremity and a distance to be focused is close;

FIG. 16B shows lateral chromatic aberration, when the three-group zoom lens according to the second embodiment is positioned at the tele-extremity and the distance to be focused is close;

FIG. 16C shows astigmatism when the three-group zoom lens according to the second embodiment is positioned at the tele-extremity and distance to be focused is close;

FIG. 16D shows distortion when the three-group zoom lens according to the second embodiment is positioned at the tele-extremity and the distance to be focused is close;

Figures 17A, 17B, 17C, 17D, 18A, 18B, 18C, 18D:
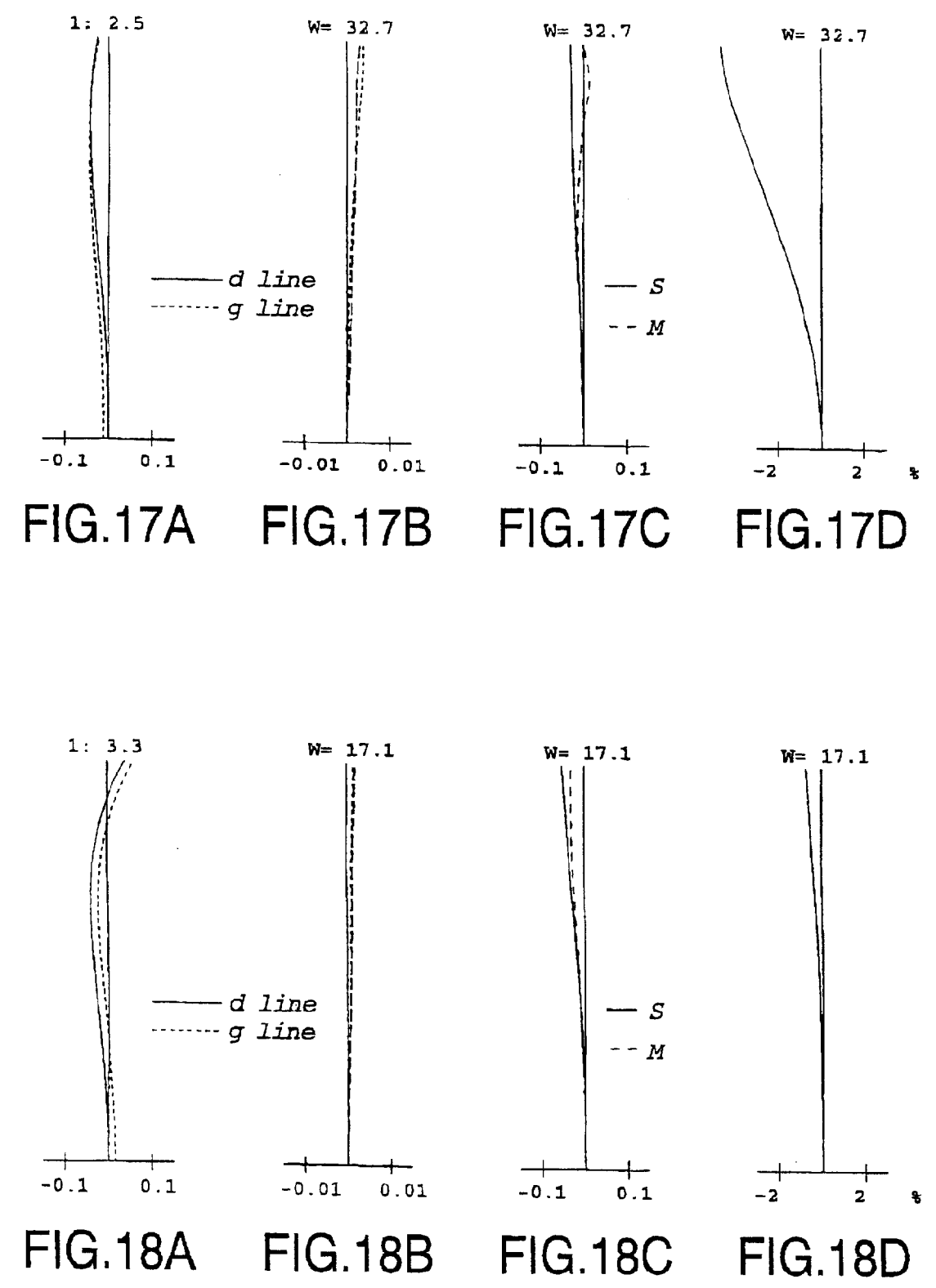

FIG. 17A shows chromatic aberration indicated by spherical aberration when a three-group zoom lens according to a third embodiment is positioned at the wide-extremity and a distance to be focused is infinity;

FIG. 17B shows lateral chromatic aberration when the three-group zoom lens according to the third embodiment is positioned at the wide-extremity and the distance to be focused is infinity;

FIG. 17C shows astigmatism when the three-group zoom lens according to the third embodiment is positioned at the wide-extremity and distance to be focused is infinity;

FIG. 17D shows distortion when the three-group zoom lens according to the third embodiment is positioned at the wide-extremity and the distance to be focused is infinity;

FIG. 18A shows chromatic aberration indicated by spherical aberration when a three-group zoom lens according to a third embodiment is positioned at the intermediate position and a distance to be focused is infinity;

FIG. 18B shows lateral chromatic aberration when the three-group zoom lens according to the third embodiment is positioned at the intermediate position and the distance to be focused is infinity;

FIG. 18C shows astigmatism when the three-group zoom lens according to the third embodiment is positioned at the intermediate position and distance to be focused is infinity;

FIG. 18D shows distortion when the three-group zoom lens according to the third embodiment is positioned at the intermediate position and the distance to be focused is infinity;

Figures 19A, 19B, 19C, 19D, 20A, 20B, 20C, 20D:
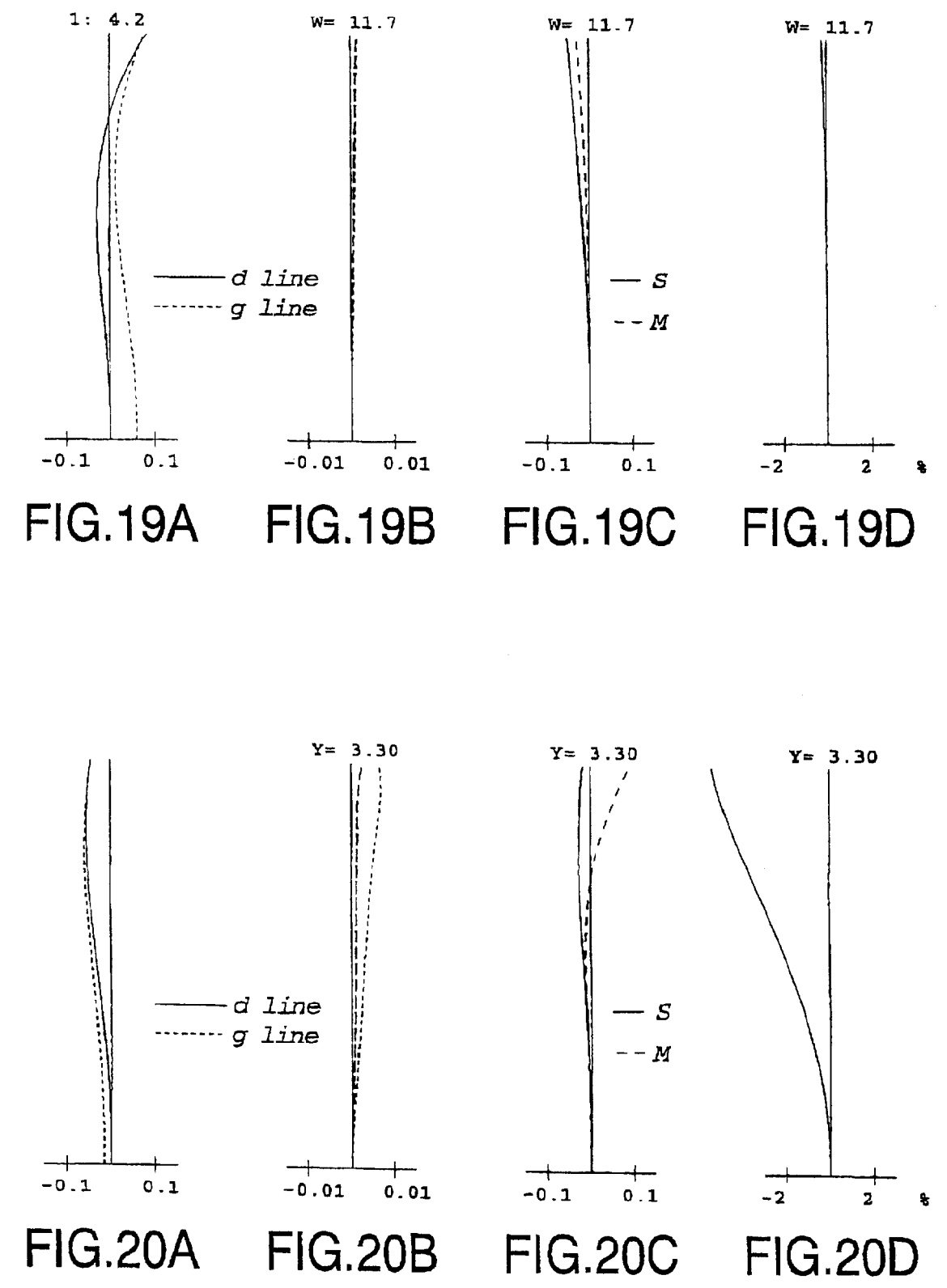

FIG. 19A shows chromatic aberration indicated by spherical aberration when a three-group zoom lens according to a third embodiment is positioned at the tele-extremity and a distance to be focused is infinity;

FIG. 19B shows lateral chromatic aberration when the three-group zoom lens according to the third embodiment is positioned at the tele-extremity and the distance to be focused is infinity;

FIG. 19C shows astigmatism when the three-group zoom lens according to the third embodiment is positioned at the tele-extremity and distance to be focused is infinity;

FIG. 19D shows distortion when the three-group zoom lens according to the third embodiment is positioned at the tele-extremity and the distance to be focused is infinity;

FIG. 20A shows chromatic aberration indicated by spherical aberration when a three-group zoom lens according to a third embodiment is positioned at the wide-extremity and a distance to be focused is close;

FIG. 20B shows lateral chromatic aberration, when the three-group zoom lens according to the third embodiment is positioned at the wide-extremity and the distance to be focused is close;

FIG. 20C shows astigmatism when the three-group zoom lens according to the third embodiment is positioned at the wide-extremity and distance to be focused is close;

FIG. 20D shows distortion when the three-group zoom lens according to the third embodiment is positioned at the wide-extremity and the distance to be focused is close;

DESCRIPTION OF THE EMBODIMENTS

Figures 7A, 7B, 7C, 7D:
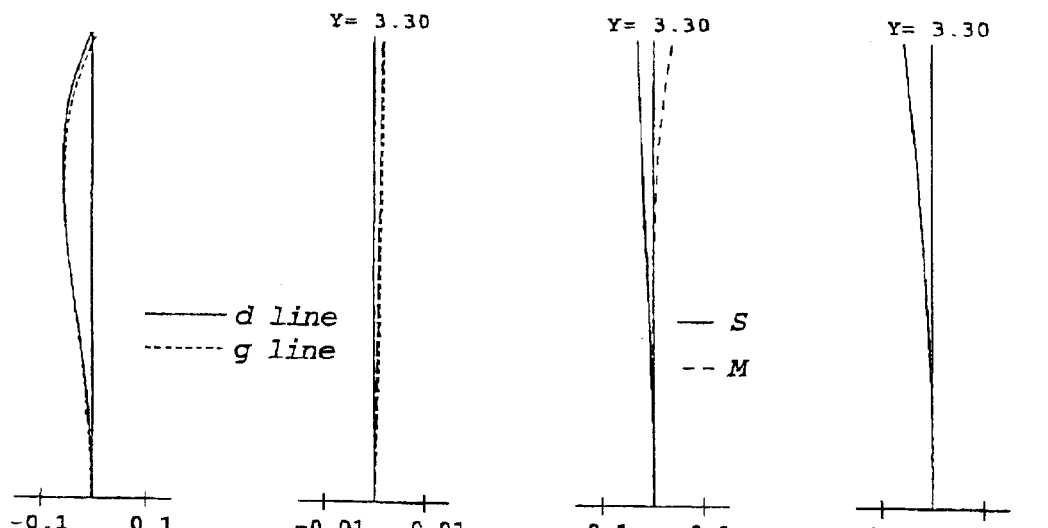
FIG. 7A shows chromatic aberration indicated by spherical aberration for d-line and g-line, when a three-group zoom lens according to a first embodiment is positioned at the intermediate position and a distance to be focused is close.
FIG. 7B shows lateral chromatic aberration, when the three-group zoom lens according to the first embodiment is positioned at the intermediate position and the distance to be focused is close.
FIG. 7C shows astigmatism when the three-group zoom lens according to the first embodiment is positioned at the intermediate position and distance to be focused is close.
FIG. 7D shows distortion when the three-group zoom lens according to the first embodiment is positioned at the intermediate position and the distance to be focused is close.
Figures 8A, 8B, 8C, 8D:
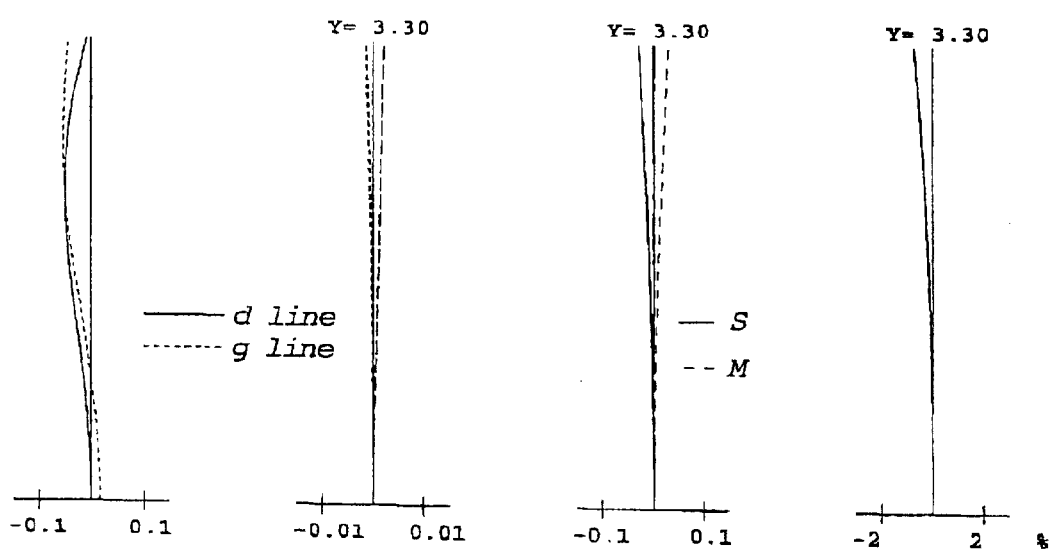
FIG. 8A shows chromatic aberration indicated by spherical aberration for d-line and g-line, when a three-group zoom lens according to a first embodiment is positioned at the tele-extremity and a distance to be focused is close.
FIG. 8B shows lateral chromatic aberration, when the three-group zoom lens according to the first embodiment is positioned at the tele-extremity and the distance to be focused is close.
FIG. 8C shows astigmatism when the three-group zoom lens according to the first embodiment is positioned at the tele-extremity and distance to be focused is close.
FIG. 8D shows distortion when the three-group zoom lens according to the first embodiment is positioned at the tele-extremity and the distance to be focused is close.

Hereinafter, three-group zoom lenses to which the present invention is applied will be described, referring to the accompanying drawings.

FIG. 1A shows a lens arrangement of a three-group zoom lens, to which the invention is applied. In FIG. 1A, the lens groups are arranged so that the zoom lens has the smallest focal length. In the specification, such a condition will be described such that the zoom lens is positioned at a wide-extremity. FIG. 1B shows a lens arrangement of the three-group zoom lens when the zoom lens has the longest focal length. This arrangement will be described such that the zoom lens is positioned at a tele-extremity.

As shown in FIGS. 1A and 1B, the three-group zoom lens has a first lens group G1, a second lens group G2 and a third lens group G3, in the order from an object side (i.e., left-hand side in the drawing).

The first lens group G1 has a negative power, the second lens group G2 has a positive power, and the third lens group G3 has a positive power.

The first lens group G1 includes, from the object side, a positive lens, a negative meniscus lens, a negative lens and a positive lens. Since the first lens, which is closest to the object, is a positive lens, distortion can be well compensated.

The second lens group G2 includes, from the object side, a positive lens, a positive-negative composite lens (i.e., a lens composed of cemented positive lens and negative lens), and a positive lens.

The first lens group G1 is a focusing position compensating group, and the second lens group G2 is a zooming lens group. Arrows shown between FIGS. 1A and 1B indicate moving loci of the first through third lens groups G1, G2 and G3, respectively, when the zoom lens is moved between the wide-extremity and the tele-extremity.

The third lens group G3 is a focusing lens group, and consists of a single positive lens.

In the embodiments described hereinafter, when the distance to be focused is infinity, as shown in FIGS. 1A and 1B, the third lens group does not change its position even if the first and second lens groups G1 and G2 are moved for zooming. If the distance to be focused is not infinity, however, the third lens group G3 is also moved depending on the zooming condition and the distance to be focused, toward the object side with respect to the position thereof shown in FIGS. 1A and 1B.

The three-group zoom lens is configured to satisfy the following conditions (1) and (2).

$$-0.85 < f2/f1 < -0.65 \quad (1)$$

$$5.0 < f3/fw < 8.0 \quad (2)$$

where, fw represents a focal length when the zoom lens is positioned at the wide-extremity;
  f1 is a focal length of the first lens group G1;
  f2 is a focal length of the second lens group G2; and
  f3 is a focal length of the third lens group G3.

If a ratio (i.e., f2/f1) of the focal length f2 of the second lens group G2 to the focal length f1 of the first lens group G1 exceeds the upper limit of condition (1), it becomes difficult to maintain a magnification ratio of approximately 3. While, if the ratio ( f2/ f1) is lower than the lower limit of condition (1), a moving amount of the second lens group G2 is too large, and an f-number of the lens varies greatly when the lens moves between the wide-extremity and the tele-extremity.

Condition (2) defines the power of the third lens group G3. If the power of the third lens group G3 is small (i.e., the focal length f3 of the third lens group G3 is large), and a ratio ( f3/fw) of the focal length f3 of the third lens group G3 to the focal length fw of the entire zoom lens at the wide-extremity exceeds the upper limit of condition (2), it becomes difficult to maintain the telecentric characteristic. If the power of the third lens group G3 is relatively large and the ratio f3/fw is lower than the lower limit of condition (2), although the moving amount of the third lens group G3 for focusing can be made small, it becomes difficult to compensate for aberrations, in particular lateral chromatic aberration, when the distance to be focused is relatively close.

Further to the above, it is preferable that the first lens group G1 satisfies following condition (3).

$$0.37 < f1n/f1 < 0.60 \quad (3)$$

where, f1n is a combined focal length of negative lenses included in the first lens group G1.

In condition (3), if a ratio f1n/f1 exceeds the upper limit, it becomes difficult to maintain telecentric characteristic. While, if the ratio f1n/f1 is lower than the lower limit of condition (3), it is difficult to compensate for distortion.

Still optionally, it is preferable that the second lens group G2 satisfies condition (4) below.

$$0.35 < R/f2 < 0.55 \quad (4)$$

where, R is a radius of curvature of an object side surface of the cemented lens.

In the second lens group G2, if a ratio R/ f2 exceeds the upper limit of condition (4), it is difficult to compensate for distortion. While, if the ratio R/ f2 is lower than the lower limit of condition (4), it is difficult to compensate for spherical aberration and/or coma.

Further optionally, it is preferable that the third lens group G3 satisfies condition (5).

$$D2(w) < D3(t) \quad (5)$$

where, D2(w) is a distance from the rear side surface of the second lens group G2 to an image plane when the zoom lens is located at the wide-extremity; and
  D3(t) is a distance from the first surface of the third lens group G3 to the image plane when the zoom lens is located at the tele-extremity, and the distance to be focused is the closest focusable distance.

When condition (5) is satisfied, the third lens group G3 can be located at a position on the object side with respect to a position of the second lens group G2 at the wide-extremity. With this configuration, the entire zoom lens can be downsized with retaining the allowable performance thereof.

As shown in FIGS. 1A and 1B, when the zooming is performed from the wide-extremity to the tele-extremity, the first lens group G1 and the second lens group G2 move to decrease the distance therebetween, and a distance between the second lens group G2 and the third lens group G3 increases. The third lens group G3 is a focusing lens group, and the position thereof is fixed when the distance to be focused is infinity. Otherwise, the third lens group G3 is moved toward the object side with respect to the position shown in FIGS. 1A and 1B, depending on the object distance and zooming magnification. In other words, the second lens group G2 is used for zooming, the first lens group G1 is used for compensating for shift of focusing position due to movement of the second lens group G2, and the third lens group G3 is used for focusing. An aperture stop S located between the first and second lens groups G1 and G2 moves integrally with the second lens group G2.

If the movable range of the third lens group G3 is restricted so that the third lens group G3 does not interfere with the second lens group G2 when located at the wide-extremity (see FIG. 1A), then in order to focus on the closest focusable object when the zoom lens is positioned at the tele-extremity (see FIG. 1B), a relatively strong power should be assigned to the third lens group G3. However, as afore-mentioned, if the third lens group G3 has a relatively strong power in the three-group zoom lens, curvature of field and lateral chromatic aberration increases for a closely located object, which may not be compensated sufficiently.

Further, in the embodiments, one surface of the third lens group G3 is formed to be an aspherical surface, whose power is stronger at a position farther from the optical axis so that the curvature of field can be well compensated when the distance to be focused is relatively small. Furthermore, the power of the third lens group G3 is made relatively small so that the lateral chromatic aberration is well suppressed when the distance to be focused is relatively small.

Since the power of the third lens group G3 is small, a movable range of the third lens group G3 should be made relatively wide for focusing. In the embodiments, when the distance to be focused is the closest focusable distance and the zoom lens is positioned at the tele-extremity, the third lens group G3 can be located on an object side with respect to a position of the rear-most surface of the second lens group G2 when the zoom lens is positioned at the wide-telemetry. Therefore, even through the power of the third lens group G3 according to the embodiments is smaller than the conventional third lens group of the three-group zoom lens, the position of the third lens group G3, when the distance to be focused is infinity, is substantially the same as the position at which the conventional third lens group would be located.

Still optionally, regarding the third lens group G3, it is preferable that the following conditions (6) and (7) are satisfied.

$$0.0 < (R2+R1)/(R2-R1) < 1.3 \quad (6)$$

$$0.05 < \Delta III(asp) < 0.12 \quad (7)$$

where, R1 is a radius of curvature of an object side surface of the third lens group G3 (i.e., lens L9);

R2 is a radius of curvature of an image side surface of the third lens group G3 (i.e., lens L9); and $\Delta III(asp)$ is an aberration coefficient of astigmatic difference normalized such that the focal length at the tele-extremity is represented by one.

Regarding condition (6), if R1 is relatively large so that (R2+R1)/(R2-R1) is smaller than the lower limit, curvature of field cannot be compensated sufficiently when the distance to be focused is close. If R1 is relatively small so that (R2+R1)/(R2-R1) exceeds the upper limit, coma cannot be compensated sufficiently when the distance to be focused is close.

Regarding condition (7), if $\Delta III(asp)$ is smaller than the lower limit, curvature of filed when the zoom lens is positioned at the tele-extremity cannot be compensated sufficiently if the distance to be focused is close. If $\Delta III(asp)$ is greater than the upper limit, when the distance to be focused is close, curvature of field is overcorrected when the zoom lens is positioned at the tele-extremity.

Hereinafter, three embodiments according to the invention will be described, referring to drawings and TABLEs.

FIRST EMBODIMENT

FIG. 2 shows an arrangement of the lenses of the three-group zoom lens 100 according to a first embodiment of the invention. It should be noted that each of the three embodiments employs the same arrangement as shown in FIG. 2.

TABLEs 1–4 indicate numerical structure of the three-group zoom lens according to the first embodiment.

The three-group zoom lens 100 includes, from the object side (i.e., from the left-hand side in the drawing), a first lens group G1 having negative power, a second lens group G2 having positive power and a third lens group G3 having positive power.

The first lens group G1 includes, from the object side, a positive lens L1, a negative meniscus lens L2, a negative lens L3 and a positive lens L4. The second lens group G2 includes, from the object side, a positive lens L5, a cemented lens having a positive lens L6 and a negative lens L7 which are cemented to each other, and a positive lens L8. The third lens group G3 has a single positive lens L9. An aperture stop S is provided on the object side of the first surface of the second lens group G2 and is movable integrally with the second lens. In FIG. 2, L10 denotes a cover glass for an image capturing element, such as a CCD (Charge Coupled Device).

The numerical structure is indicated in TABLEs 1–4.

TABLE 1

| No | r | d | n | ν |
|---|---|---|---|---|
| #1 | 43.222 | 2.760 | 1.58913 | 61.2 |
| #2 | −131.211 | 0.200 | | |
| #3 | 39.383 | 1.000 | 1.83481 | 42.7 |
| #4 | 10.511 | 2.230 | | |
| #5 | 739.767 | 1.000 | 1.80400 | 46.6 |
| #6 | 8.734 | 1.700 | | |
| #7 | 11.244 | 2.160 | 1.80518 | 25.4 |
| #8 | 43.222 | D 8 | | |
| STOP | INFINITY | 0.700 | | |
| #9 | 13.083 | 1.920 | 1.69680 | 55.5 |
| #10 | −334.168 | 0.500 | | |
| #11 | 6.122 | 1.720 | 1.65844 | 50.9 |
| #12 | 63.558 | 2.380 | 1.80518 | 25.4 |
| #13 | 4.871 | 0.550 | | |
| #14 | 15.842 | 2.260 | 1.58913 | 61.2 |
| #15 | −97.797 | D15 | | |
| #16 | 30.292 | 1.800 | 1.69350 | 53.2 |
| #17 | −63.729 | D17 | | |
| #18 | INFINITY | 1.800 | 1.51633 | 64.1 |
| #19 | INFINITY | — | | |

TABLE 2

| | NO. 14 | NO. 16 |
|---|---|---|
| K | 0.00000000E+00 | 0.00000000E+00 |
| A4 | −0.65700000E−03 | 0.32300000E−04 |
| A6 | −0.46000000E−04 | 0.12200000E−05 |
| A8 | 0.00000000E+00 | 0.00000000E−00 |
| A10 | 0.00000000E+00 | 0.00000000E+00 |
| A12 | 0.00000000E+00 | 0.00000000E+00 |

TABLE 3

| f-No. | 1:2.5 | 1:3.4 | 1:4.2 |
|---|---|---|---|
| F | 5.40 | 10.80 | 16.00 |
| W | 32.7 | 17.1 | 11.7 |
| FB | 0.00 | 0.00 | 0.00 |
| D8 | 19.792 | 6.504 | 2.186 |
| D15 | 2.469 | 7.577 | 12.497 |
| D17 | 3.687 | 3.687 | 3.687 |

TABLE 4

| M | −0.048 | −0.095 | −0.138 |
|---|---|---|---|
| FB | 0.00 | 0.00 | 0.00 |
| D8 | 19.792 | 6.504 | 2.186 |
| D15 | 1.754 | 5.056 | 7.774 |
| D17 | 4.402 | 6.208 | 8.410 |

In TABLE 1, NO is a surface number counted from the object side, r denotes a radius of curvature, d denotes a surface distance (i.e., a thickness of a lens or a distance between facing surfaces of successively arranged lenses). Further, n is a refractive index for the d-line (588 nm), ν is Abbe's number.

Surface #14 of the lens L8 and surface #16 of the lens L9 are aspherical surfaces. Coefficients for the aspherical surfaces in a two-dimensional polynomial, which will be shown below, are indicated in TABLE 2. In TABLE 2, the radii of the surfaces #14 and #16 represent radii of curvature thereof on the optical axis.

The aspherical surface #14 is formed mainly for compensating for coma and spherical aberration. The aspherical surface #16 is formed for compensating for curvature of field for the distance to be focused between infinity and the close position. Therefore, surface #16 is configured such that the power thereof is greater at a position farther from the optical axis.

The aspherical surface is generally expressed by formula (1), which is the two-dimensional polynomial, below;

$$X(Y) = \frac{CY^2}{1+\sqrt{1-(1+K)C^2Y^2}} + A_4Y^4 + A_6Y^6 + A_8Y^8 + A_{10}Y^{10} + A_{12}Y^{12} + \ldots$$

where, X(Y) represents SAG, which is a distance of a point, whose height is Y from the optical axis, on the aspherical surface with respect to a tangential plane at the optical axis;

C represents a curvature 1/r of the aspherical surface on the optical axis, r being a radius;

K is a conical coefficient; and $A_4, A_6, A_8, A_{10}, A_{12}$ are 4-th, 6-th, 8-th, 10-th and 12-th aspherical coefficients. As mentioned above, the values of the above coefficients according to the first embodiment are indicated in TABLE 2.

In TABLE 2, D8 represents a distance between the surface #8 and the aperture stop S, D15 represents a distance between the surface #15 and the surface #16 (i.e., a distance between the second and third lens groups), D17 represents a distance between the surface #17 and the surface #18 (i.e., the distance between the third lens group G3 and the cover glass). Values D8,-D15 and D17 when the zoom lens 100 is positioned at the wide-extremity, an intermediate position, the tele-extremity are indicated in TABLE 3 (the distance to be focused is infinity) and TABLE 4 (the distance to be focused is close).

In the first embodiment, f2/f1=−0.77, f3/f2=5.53, f1n/f1=0.41 and R/f2=0.42. Further, D2(w)=9.14, D3(f)=11.40, (R2+R1)/(R2−R1)=0.42 and ΔIII(asp)=0.09. Accordingly, conditions (1)–(7) are all satisfied. Further, the f-number does not change largely when the lens moves between the wide-extremity and the tele-extremity.

FIGS. 3A–3D, 4A–4D, 5A–5D, 6A–6D, 7A–7D and 8A–8D show aberration diagrams of the zoom lens 100 according to the first embodiment.

FIGS. 3A–3D, 4A–4D and 5A–5D show chromatic aberration represented by spherical aberration (d-line: 588 nm; and g-line: 436 nm), lateral chromatic aberration, astigmatism (S:sagintal; M:meridional) and distortion at the wide-extremity, intermediate position and the tele-extremity, respectively, when the distance to be focused is infinity.

FIGS. 6A–6D, 7A–7D and 8A–8D show chromatic aberration represented by spherical aberration, lateral chromatic aberration, astigmatism and distortion at the wide-extremity, intermediate position and the tele-extremity, respectively, when the distance to be focused is close.

Figure 9A:
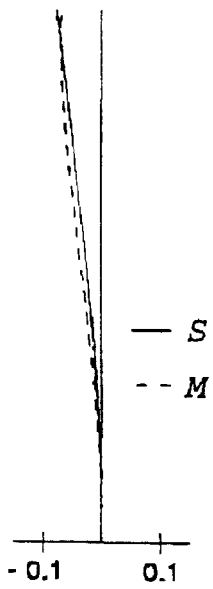
FIG. 9A shows astigmatism of the three-group zoom lens positioned at the tele-extremity, distance to be focused being infinity, when the aspherical surface is not formed.
Figure 9B:
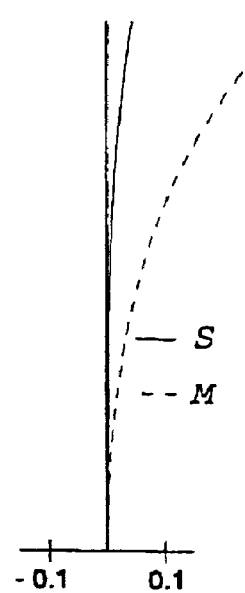
FIG. 9B shows astigmatism of the three-group zoom lens positioned at the tele-extremity, distance to be focused being close, when the aspherical surface is not formed.
Figure 10A:
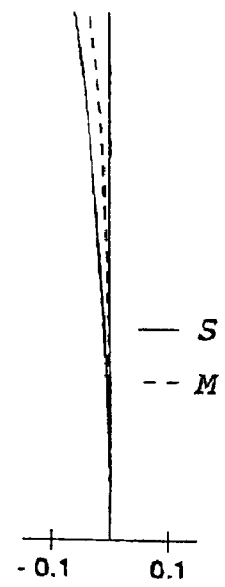
FIG. 10A shows astigmatism of the three-group zoom lens positioned at the tele-extremity, distance to be focused being infinity, when the aspherical surface is formed.
Figure 10B:
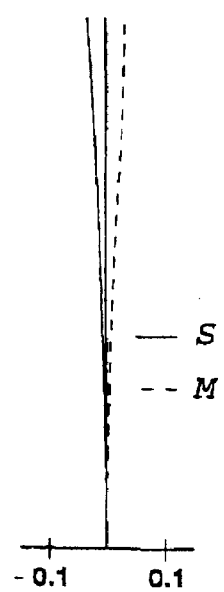
FIG. 10B shows astigmatism of the three-group zoom lens positioned at the tele-extremity, distance to be focused being close, when the aspherical surface is formed.
Figures 21A, 21B, 21C, 21D:
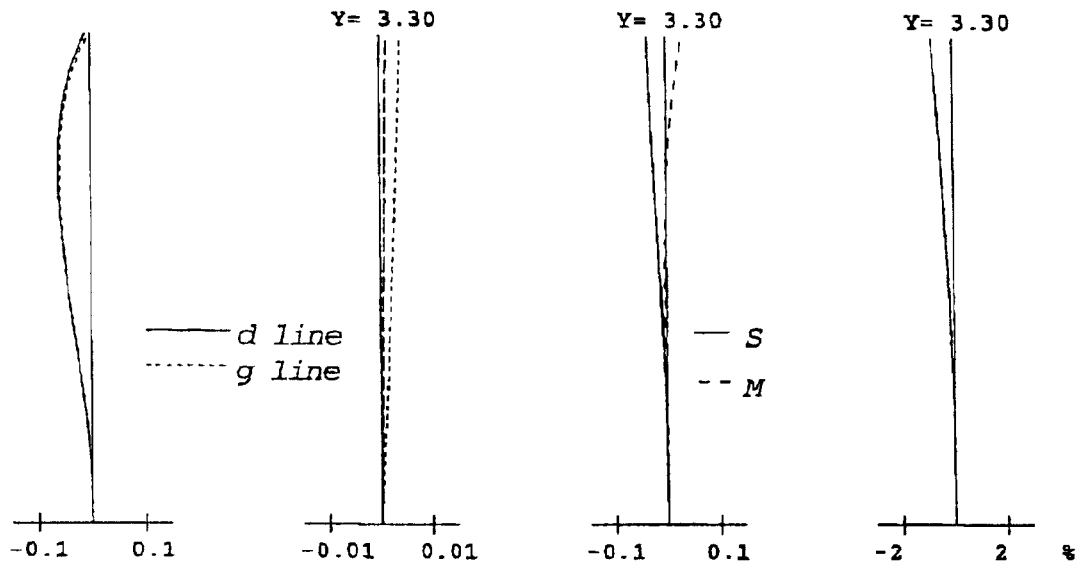
FIG. 21A shows chromatic aberration indicated by spherical aberration for d-line and g-line, when a three-group zoom lens according to a third embodiment is positioned at the intermediate position and a distance to be focused is close.
FIG. 21B shows lateral chromatic aberration, when the three-group zoom lens according to the third embodiment is positioned at the intermediate position and the distance to be focused is close.
FIG. 21C shows astigmatism when the three-group zoom lens according to the third embodiment is positioned at the intermediate position and distance to be focused is close.
FIG. 21D shows distortion when the three-group zoom lens according to the third embodiment is positioned at the intermediate position and the distance to be focused is close.
Figures 22A, 22B, 22C, 22D:
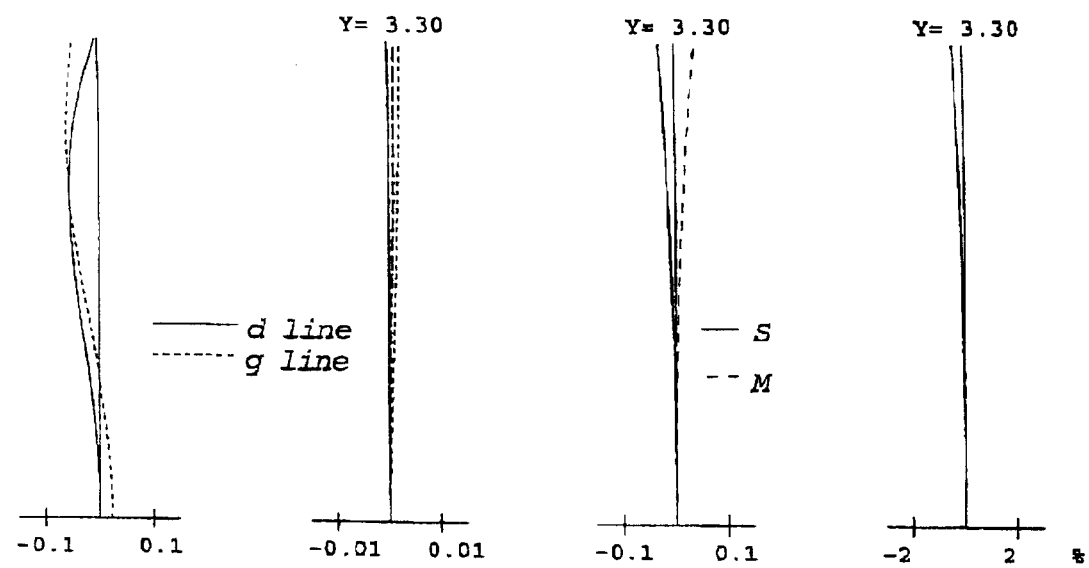
FIG. 22A shows chromatic aberration indicated by spherical aberration when a three-group zoom lens according to a third embodiment is positioned at the tele-extremity and a distance to be focused is close.
FIG. 22B shows lateral chromatic aberration, when the three-group zoom lens according to the third embodiment is positioned at the tele-extremity and the distance to be focused is close.
FIG. 22C shows astigmatism when the three-group zoom lens according to the third embodiment is positioned at the tele-extremity and distance to be focused is close.
FIG. 22D shows distortion when the three-group zoom lens according to the third embodiment is positioned at the tele-extremity and the distance to be focused is close.

FIGS. 9A, 9B, 10A and 10B show astigmatism characteristics when the distances to be focused are infinity and close, respectively. FIGS. 9A and 9B show characteristics when the aspherical surfaces are not formed, and FIGS. 10A and 10B shows characteristics when the aspherical surfaces are formed. As understood from the drawings, by forming the aspherical surfaces, the spherical aberration and the curvature of field are well compensated, in particular, when the distance to be focused is close.

SECOND EMBODIMENT

The numerical structure of the second embodiment is indicated in TABLEs 5–8.

TABLE 5

| No | r | d | n | ν |
|---|---|---|---|---|
| #1 | 55.142 | 2.540 | 1.58913 | 61.2 |
| #2 | −133.765 | 0.200 | | |
| #3 | 34.341 | 1.130 | 1.83481 | 42.7 |
| #4 | 10.711 | 2.130 | | |
| #5 | 161.643 | 1.000 | 1.80400 | 46.6 |
| #6 | 8.990 | 1.920 | | |
| #7 | 11.654 | 2.080 | 1.80518 | 25.4 |
| #8 | 39.607 | D8 | | |
| STOP | INFINITY | 0.700 | | |
| #9 | 13.234 | 1.360 | 1.69680 | 55.5 |
| #10 | −212.728 | 0.200 | | |
| #11 | 6.231 | 1.960 | 1.58913 | 61.2 |
| #12 | 41.951 | 3.030 | 1.80518 | 25.4 |
| #13 | 4.989 | 0.490 | | |
| #14 | 14.131 | 1.550 | 1.58913 | 61.2 |
| #15 | −250.752 | D15 | | |
| #16 | 29.549 | 1.730 | 1.69350 | 53.2 |
| #17 | −71.959 | D17 | | |
| #18 | INFINITY | 1.800 | 1.51633 | 64.1 |
| #19 | INFINITY | — | | |

TABLE 6

| | NO. 14 | NO. 16 |
|---|---|---|
| K | 0.00000000E+00 | 0.00000000E+00 |
| A4 | −0.81700000E−03 | 0.44600000E−04 |
| A6 | −0.62400000E−04 | 0.19900000E−05 |
| A8 | 0.00000000E+00 | 0.00000000E+00 |
| A10 | 0.00000000E+00 | 0.00000000E+00 |
| A12 | 0.00000000E+00 | 0.00000000E+00 |

TABLE 7

| f-No. | 1:2.5 | 1:3.3 | 1:4.2 |
|---|---|---|---|
| F | 5.40 | 10.80 | 16.00 |
| W | 32.6 | 17.1 | 11.7 |
| FB | 0.00 | 0.00 | 0.00 |
| D8 | 20.857 | 6.792 | 2.222 |
| D15 | 2.505 | 7.205 | 11.731 |
| D17 | 3.442 | 3.442 | 3.442 |

TABLE 8

| M | −0.048 | −0.096 | −0.139 |
|---|---|---|---|
| FB | 0.00 | 0.00 | 0.00 |
| D8 | 20.857 | 6.792 | 2.222 |
| D15 | 1.753 | 4.573 | 6.820 |
| D17 | 4.193 | 6.074 | 8.353 |

Symbols in the TABLEs 5–8 have the same meanings as the symbols in TABLEs 1–4.

In the second embodiment, surface #14 of the lens L8 and surface #16 of the lens L9 are aspherical surfaces. Coefficients for the aspherical surfaces in a two-dimensional polynomial are indicated in TABLE 6. In TABLE 5, values in relation to the surfaces #14 and #16 represent radii of curvature thereof on the optical axis.

In the second embodiment, $f2/f1=-0.72$, $f3/fw=5.63$, $f1n/f1=0.42$, $R/f2-0.43$, $D2(w)=8.86$, $D3(f)=11.27$, $(R2+R1)/(R2-R1)=0.36$ and $\Delta III(asp)=0.08$. Accordingly, conditions (1)–(7) are all satisfied. Further, the f-number does not change largely when the lens moves between the wide-extremity and the tele-extremity.

THIRD EMBODIMENT

FIGS. 11A–11D, 12A–12D, 13A–13D, 14A–14D, 15A–15D and 16A–16D show aberration diagrams according to the third embodiment.

FIGS. 11A–11D, 12A–12D and 13A–13D show chromatic aberration represented by spherical aberration (d-line: 588 nm; and g-line: 436 nm), lateral chromatic aberration, astigmatism (S: sagittal; M: meridional) and distortion when the zoom lens 200 is positioned at the wide-extremity, intermediate position and the tele-extremity, respectively, when the distance to be focused is infinity.

FIGS. 14A–14D, 15A–15D and 16A–16D show chromatic aberration represented by spherical aberration, lateral chromatic aberration, astigmatism and distortion when the zoom lens 100 is positioned at the wide-extremity, intermediate position and the tele-extremity, respectively, when the distance to be focused is close.

The numerical structure of the third embodiment is indicated in TABLEs 9–12.

TABLE 9

| No | r | d | n | ν |
|---|---|---|---|---|
| #1 | 32.915 | 2.900 | 1.62280 | 57.0 |
| #2 | −257.587 | 0.200 | | |
| #3 | 42.395 | 1.000 | 1.83481 | 42.7 |
| #4 | 10.364 | 2.280 | | |
| #5 | INFINITY | 1.000 | 1.80400 | 46.6 |
| #6 | 9.037 | 1.880 | | |
| #7 | 11.861 | 2.080 | 1.80518 | 25.4 |
| #8 | 44.717 | D8 | | |
| STOP | INFINITY | 0.700 | | |
| #9 | 11.942 | 1.380 | 1.69680 | 55.5 |
| #10 | 710.645 | 0.320 | | |
| #11 | 6.241 | 2.030 | 1.58913 | 61.2 |
| #12 | 39.815 | 2.500 | 1.80518 | 25.4 |
| #13 | 5.208 | 0.730 | | |
| #14 | 14.574 | 1.710 | 1.58913 | 61.2 |
| #15 | −182.342 | D15 | | |
| #16 | 30.371 | 2.100 | 1.58913 | 61.2 |
| #17 | −73.259 | D17 | | |
| #18 | INFINITY | 1.800 | 1.51633 | 64.1 |
| #19 | INFINITY | — | | |

TABLE 10

| | NO. 14 | NO. 16 |
|---|---|---|
| K | 0.00000000E+00 | 0.00000000E+00 |
| A4 | −0.83800000E−03 | 0.28200000E−04 |
| A6 | −0.53500000E−04 | 0.19300000E−05 |
| A8 | 0.00000000E+00 | 0.00000000E+00 |
| A10 | 0.00000000E+00 | 0.00000000E+00 |
| A12 | 0.00000000E+00 | 0.00000000E+00 |

TABLE 11

| f-No. | 1:2.5 | 1:3.3 | 1:4.2 |
|---|---|---|---|
| F | 5.40 | 10.80 | 16.00 |
| W | 32.7 | 17.1 | 11.7 |
| FB | 0.00 | 0.00 | 0.00 |
| D8 | 20.272 | 6.560 | 2.104 |
| D15 | 2.007 | 6.798 | 11.412 |
| D17 | 3.738 | 3.738 | 3.738 |

TABLE 12

| M | −0.048 | −0.096 | −0.141 |
|---|---|---|---|
| FB | 0.00 | 0.00 | 0.00 |
| D8 | 20.272 | 6.560 | 2.104 |
| D15 | 1.185 | 3.917 | 6.013 |
| D17 | 4.560 | 6.619 | 9.137 |

Symbols in the TABLEs 9–12 have the same meanings as the symbols in TABLEs 1–4.

In the third embodiment, surface #14 of the lens L8 and surface #16 of the lens L9 are aspherical surfaces. Coefficients for the aspherical surfaces in a two-dimensional polynomial are indicated in TABLE 10. In TABLE 9, radii of the surfaces #14 and #16 represent radii of curvature thereof on the optical axis.

In the third embodiment, $f2/f1=-0.75$, $f3/fw-6.80$, $f1n/f1=0.40$ and $R/f2=0.45$, $D2(w)=9.03$ and $D3(f)=12.42$, $(R2+R1)/(R2-R1)=0.41$ and $\Delta III(asp)=0.06$.

TABLE 13 shows conditions (1)–(7) for each of the above-described embodiments.

TABLE 13

| parameter | 1st | 2nd | 3rd |
|---|---|---|---|
| (1) f2/f1 | −0.77 | −0.72 | −0.75 |
| (2) f3/fw | 5.53 | 5.63 | 6.80 |
| (3) f1n/f1 | 0.41 | 0.42 | 0.40 |
| (4) R/f2 | 0.42 | 0.43 | 0.45 |
| (5) D2(w) < D3(t) | D2(w) = 9.14  D3(t) = 11.40 | D2(w) = 8.86  D3(t) = 11.27 | D2(w) = 9.03  D3(t) = 12.42 |
| (6) (R2 + R1)/(R2 − R1) | 0.42 | 0.36 | 0.41 |
| (7) ΔIII (asp) | 0.09 | 0.08 | 0.06 |

As shown in TABLE 13, in each embodiment, conditions (1)–(7) are all satisfied. Further, the f-number does not change largely when the zoom lens 100 is moved between the wide-extremity and the tele-extremity.

The present disclosure relates to the subject matter contained in Japanese Patent Application No. 2000-025381, filed on Feb. 2, 2000, which is expressly incorporated herein by reference in its entirety.

What is claimed is:

1. A three-group zoom lens having, from an object side, a first group lens, a second ground lens and a third group lens, said first lens group having a negative power, said second lens group having a positive power, said second lens group including an aperture stop, said third lens group consisting of a single positive lens, wherein, when a distance to be focused is infinity, only said first lens group and said second lens group move for zooming, wherein said single positive lens has at least one aspherical surface with a positive power that is stronger at a portion farther from an optical axis of said single positive lens, wherein said zoom lens satisfies the following conditions:

$$-0.85 < f2/f1 < -0.65;$$

and $$5.0 < f3/fw < 8.0,$$

wherein, fw represents a focal length when said zoom lens is positioned at a wide-extremity, f1 represents a focal length of said first lens group, f2 represents a focal length of said second lens group, and f3 represents a focal length of said third lens group.

2. The zoom lens according to claim 1, wherein said first lens group includes, from the object side, a positive lens, a negative meniscus lens, a negative lens and a positive lens, and wherein said first lens group satisfies a following condition:

$$0.37 < f1n/f1 < 0.60;$$

wherein, f1n represents a combined focal length of negative lenses included in said first lens group.

3. The zoom lens according to claim 2, wherein said second lens group includes, from the object side, a positive lens, a cemented lens including a positive lens and a negative lens, and a positive lens, and wherein said second lens group satisfies a condition:

$$0.35 < R/f2 < 0.55$$

wherein R represents a radius of curvature of an object side surface of said cemented lens.

4. The zoom lens according to claim 3, satisfying condition:

$$D2(w) < D3(t),$$

wherein D2(w) represents a distance between an image side surface of said second lens group and an image plane when said zoom lens is positioned at a wide-extremity, and wherein D3(t) represents a distance between a first surface of said third lens group and the image plane when said zoom lens is positioned at the wide-extremity and a distance to be focused is a closest focusable distance.

5. The zoom lens according to claim 4, which satisfies following conditions:

$$0.0 < (R2+R1)/(R2-R1) < 1.3$$

and $$0.05 < \Delta III (asp) < 0.12,$$

wherein, R1 is a radius of curvature of an object side surface of said third lens group, R2 is a radius of curvature of an image side surface of said third lens group, and ΔIII(asp) is an aberration coefficient of astigmatic difference normalized such that the focal length of said zoom lens positioned at a tele-extremity is represented by one.

6. The zoom lens according to claim 1, wherein said second lens group includes, from the object side, a positive lens, a cemented lens including a positive lens and a negative lens, and a positive lens, and wherein said second lens group satisfies a condition:

$$0.35 < R/f2 < 0.55$$

wherein R represents a radius of curvature of an object side surface of said cemented lens.

7. The zoom lens according to claim 1, satisfying condition:

$$D2(w) < D3(t),$$

wherein D2(w) represents a distance between an image side surface of said second lens group and an image plane when said zoom lens is positioned at a wide-extremity, and wherein D3(t) represents a distance between a first surface of said third lens group and the image plane when said zoom lens is positioned at the wide-extremity and a distance to be focused is a closest focusable distance.

8. The zoom lens according to claim 1, which satisfies following conditions:

$$0.0 < (R2+R1)/(R2-R1) < 1.3$$

and $$0.05 < \Delta III (asp) < 0.12$$

wherein, R1 is a radius of curvature of an object side surface of said third lens group, R2 is a radius of curvature of an image side surface of said third lens group, and ΔIII(asp) is an aberration coefficient of astigmatic difference normalized such that the focal length of said zoom lens positioned at a tele-extremity is represented by one.

9. A three-group zoom lens comprising, from an object side, a first group lens, a second group lens and a third group lens, said first lens group having a negative power, said second lens group having a positive power and an aperture stop, said third lens group consisting of a single positive lens, wherein only said first lens group and said second lens group move for zooming when a distance to be focused is infinity, at least one positive lens included in said zoom lens having an aspherical surface whose positive power is greater at a portion farther from an optical axis thereof, said zoom lens satisfying the following conditions:

$$-0.85 < f2/f1 < -0.65,$$

and $$5.0 < f3/fw < 8.0,$$

wherein fw represents a focal length when said zoom lens is positioned at a wide-extremity, f1 represents a focal length of said first lens group, f2 represents a focal length of said second lens group, and f3 represents a focal length of said third lens group, and wherein said first lens group includes, from the object side, a positive lens, a negative meniscus lens, a negative lens and a positive lens, said first lens group satisfying a following condition:

$0.37 < f1n/f1 < 0.60$, wherein f1n represents a combined focal length of negative lenses included in said first lens group.

10. The zoom lens of claim 9, wherein said second lens group includes, from the object side, a positive lens, a cemented lens including a positive lens and a negative lens, and a positive lens, said second lens group satisfying a following condition:

$0.35 < R/f2 < 0.55$, wherein

R represents a radius of curvature of an object side surface of said cemented lens.

11. The zoom lens of claim 10, wherein a following condition is satisfied:

$D2(w) < D3(t)$, wherein

D2(w) represents a distance between an image side surface of said second lens group and an image plane when said zoom lens is positioned at a wide-extremity, and D3(t) represents a distance between a first surface of said third lens group and the image plane when said zoom lens is positioned at the wide-extremity and a distance to be focused is a closest focusable distance.

12. The zoom lens of claim 11, wherein the following conditions are satisfied:

$0.0 < (R2+R1)/(R2-R1) < 1.3$, and $0.05 < \Delta III(asp) < 0.12$, wherein

R1 represents a radius of curvature of an object side surface of said third lens group, R2 represents a radius of curvature of an image side surface of said third lens group, and ΔIII(asp) represents an aberration coefficient of astigmatic difference normalized such that the focal length of said zoom lens positioned at a tele-extremity is represented by one.

13. A three-group zoom lens comprising, from an object side, a first group lens, a second ground lens and a third group lens, said first lens group having a negative power, said second lens group having a positive power and an aperture stop, said third lens group consisting of a single positive lens, wherein only said first lens group and said second lens group move for zooming when a distance to be focused is infinity, at least one positive lens included in said zoom lens having an aspherical surface whose positive power is greater at a portion farther from an optical axis thereof, said zoom lens satisfying the following conditions:

$-0.85 < f2/f1 < -0.65$, and $5.0 < f3/fw < 8.0$, wherein fw represents a focal length when said zoom lens is positioned at a wide-extremity, f1 represents a focal length of said first lens group, f2 represents a focal length of said second lens group, and f3 represents a focal length of said third lens group, and wherein said second lens group includes, from the object side, a positive lens, a cemented lens including a positive lens and a negative lens, and a positive lens, said second lens group satisfying a following condition:

$0.35 < R/f2 < 0.55$, wherein

R represents a radius of curvature of an object side surface of said cemented lens.

14. A three-group zoom lens comprising, from an object side, a first group lens, a second ground lens and a third group lens, said first lens group having a negative power, said second lens group having a positive power and an aperture stop, said third lens group consisting of a single positive lens, wherein only said first lens group and said second lens group move for zooming when a distance to be focused is infinity, at least one positive lens included in said zoom lens having an aspherical surface whose positive power is greater at a portion farther from an optical axis thereof, said zoom lens satisfy the following conditions:

$-0.85 < f2/f1 < -0.65$, $5.0 < f3/fw < 8.0$, and $D2(w) < D3(t)$, wherein fw represents a focal length when said zoom lens is positioned at a wide-extremity, f1 represents a focal length of said first lens group, f2 represents a focal length of said second lens group, f3 represents a focal length of said third lens group, D2(w) represents a distance between an image side surface of said second lens group and an image plane when said zoom lens is positioned at a wide-extremity, and D3(t) represents a distance between a first surface of said third lens group and the image plane when said zoom lens is positioned at the wide-extremity and a distance to be focused is a closest focusable distance.

15. A three-group zoom lens comprising, from an object side, a first group lens, a second ground lens and a third group lens, said first lens group having a negative power, said second lens group having a positive power and an aperture stop, said third lens group consisting of a single positive lens, wherein only said first lens group and said second lens group move for zooming when a distance to be focused is infinity, at least one positive lens included in said zoom lens having an aspherical surface whose positive power is greater at a portion farther from an optical axis thereof, said zoom lens satisfying the following conditions:

$-0.85 < f2/f1 < -0.65$, $5.0 < f3/fw < 8.0$, $0.0 < (R2+R1)/(R2-R1) < 1.3$, and $0.05 < \Delta III(asp) < 0.12$, wherein
- fw represents a focal length when said zoom lens is positioned at a wide-extremity, f1 represents a focal length of said first lens group,
- f2 represents a focal length of said second lens group,
- f3 represents a focal length of said third lens group,
- R1 represents a radius of curvature of an object side surface of said third lens group,
- R2 represents a radius of curvature of an image side surface of said third lens group, and
- ΔIII(asp) represents an aberration coefficient of an astigmatic difference normalized such that said focal length of said zoom lens positioned at a tele-extremity is represented by one.

16. A three-group zoom lens having, from an object side, a first group lens, a second ground lens and a third group lens, said first lens group having a negative power, said second lens group having a positive power and an aperture stop, said third lens group consisting of a single positive lens, said single positive lens having at least one aspherical surface configured to compensate for a curvature of field, said at least one aspherical surface having a positive power that is stronger at a portion farther from an optical axis of said single positive lens.

17. The three-group zoom lens of claim 16, wherein a distance to be focused is infinity, only when said first lens group and said second lens group move for zooming.

* * * * *